(12) United States Patent
Tamura et al.

(10) Patent No.: US 6,980,251 B1
(45) Date of Patent: Dec. 27, 2005

(54) IMAGE SENSING APPARATUS WHICH CARRIES OUT OPTIMUM EXPOSURE CONTROL OF SUBJECT

(75) Inventors: Kyoji Tamura, Yokohama (JP); Motoi Tariki, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/614,196

(22) Filed: Mar. 12, 1996

(30) Foreign Application Priority Data

| Mar. 17, 1995 | (JP) | ................................. 7-058904 |
| Apr. 7, 1995 | (JP) | ................................. 7-082643 |
| Apr. 7, 1995 | (JP) | ................................. 7-082645 |

(51) Int. Cl.[7] ............................................. H04N 5/235
(52) U.S. Cl. ..................... 348/362; 348/363; 348/224.1
(58) Field of Search ................................ 348/362, 363, 348/364, 229, 230, 350, 169–172, 15, 64, 348/229.1, 350.1, 230.1; 396/49, 236, 223, 396/233, 234, 244, 250, 281, 224

(56) References Cited

U.S. PATENT DOCUMENTS

| 3,945,025 | A | * | 3/1976 | Stempeck | .................. | 396/244 |
| 5,280,359 | A | * | 1/1994 | Mimura et al. | ............. | 348/230 |
| 5,349,415 | A | * | 9/1994 | Nishida | ....................... | 348/364 |
| 5,400,074 | A | * | 3/1995 | Shimizu | ....................... | 348/363 |
| 5,461,452 | A | * | 10/1995 | Iwasaki | ....................... | 354/410 |
| 5,473,374 | A | * | 12/1995 | Shimizu et al. | ............. | 348/363 |
| 5,570,156 | A | * | 10/1996 | Arai et al. | ...................... | 396/51 |
| 5,579,156 | A | * | 11/1996 | Faltermeier et al. | ......... | 359/363 |
| 5,648,814 | A | * | 7/1997 | Munson | ....................... | 348/15 |
| 6,630,949 | B1 | * | 10/2003 | Yamagishi | ............. | 348/207.99 |

* cited by examiner

*Primary Examiner*—James J. Groody
*Assistant Examiner*—Christopher Onuaku
(74) *Attorney, Agent, or Firm*—Morgan & Finnegan, LLP

(57) ABSTRACT

The state of exposure of a video zone corresponding to position information from a two-dimensional position selecting circuit that allows a photographer to select a desired video zone is detected, an exposure correction is performed by an exposure control circuit based upon a signal indicative of the detected state, and the state of exposure which prevails when optimum exposure has been attained is maintained. As a result, the state of exposure of a subject is corrected to an optimum exposure and the optimum exposure of the subject is maintained even if the state of exposure of the surroundings change owing to a change in zoom magnification or movement of the subject.

15 Claims, 14 Drawing Sheets

FIG. 6

② LUT EXAMPLE 2

| DATA No. | IRIS DATA | AGC DATA | SHUTTER DATA |
|---|---|---|---|
| data1 | OPEN | MAX | 1/60 |
| data2 | ------> | 18dB | |
| data3 | | 12dB | |
| data4 | | 6dB | |
| data5 | | 0dB | |
| data6 | F2.8 | ------> | |
| data7 | F4 | | |
| data8 | F5.6 | | |
| data9 | F8 | | |
| data10 | F11 | | |
| data11 | F22 | | |
| data12 | F32 | | |
| data13 | ------> | | |
| data14 | | | 1/100 |
| data15 | | | 1/250 |
| data16 | | | 1/500 |
| data17 | CLOSE | | 1/1000 |

① LUT EXAMPLE 1

| DATA No. | IRIS DATA |
|---|---|
| data1 | OPEN |
| data2 | F.2.8 |
| data3 | F4 |
| data4 | F5.6 |
| data5 | F8 |
| data6 | F11 |
| data7 | F16 |
| data8 | F22 |
| data9 | F32 |
| data10 | CLOSE |

IMAGE SENSING APPARATUS WHICH CARRIES OUT OPTIMUM EXPOSURE CONTROL OF SUBJECT

BACKGROUND OF THE INVENTION

1. Field of the Invention

This invention relates to an image sensing apparatus so adapted that optimum exposure control is carried out with regard to any range of video signals obtained by imaging.

2. Description of the Related Art

The recent progress made in the field of video equipment such as video cameras has been remarkable and such equipment has been provided with greater functionality and capability. In order for such image sensing apparatus to be able to perform optimum photography at all times under a large variety of photographic conditions, exposure control is very important. For example, it is difficult for the photographer to optimally adjust the exposure of the subject at all times while maintaining the balance between the exposure of the subject and the exposure of the surroundings of the subject. Often the image resulting from photography is too bright or too dark (what is caled saturation or noise (darkness)).

Exposure control in a conventional image sensing apparatus will now be described.

FIG. 4 is a block diagram showing an example of the construction of an image sensing apparatus such as a video camera which exemplifies the prior art.

The image sensing apparatus of FIG. 4 includes a lens group 1 for imaging a subject, and a diaphragm mechanism 2 such as an iris 2 having a diaphragm vane structure for controlling the amount of incident light, or liquid-crystal means for controlling the amount of transmitted light.)

The image sensing apparatus further includes an image sensing device 3 such as a CCD for photoelectrically converting the incident light, an iris encoder (IE) 4 serving as iris detecting means using a Hall device or the like to detect the state of the diaphragm mechanism, a drive motor 5 such as an iris galvanometer (IG meter) for driving the diaphragm mechanism, a circuit 6 for controlling the image sensing device 3, reading out the image signal resulting from the photoelectric conversion and controlling a so-called electronic shutter function, namely a function which controls signal storage time. A sample-and-hold circuit 7 samples and holds the signal resulting from the photoelectric conversion performed by the image sensing device 3. An automatic gain control circuit (referred to as an "AGC" circuit below) 8 varies gain for electrically amplifying the image signal outputted by the sample-and-hold circuit 7.

A camera-signal processing circuit 9a subjects the signal from the AGC circuit 8 to processing such as a gamma correction, color separation and color-difference matrix operation and the adds on a synchronizing signal to produce a standard TV signal. This circuit applies processing to a signal that is in analog form.

A video tape recorder (referred to as a "VTR" below) 10 records the video signal from the processing circuit 9a on tape. An electronic viewfinder (referred to as an "EVF" below) 11 is for monitoring the video being shot. An AE detector circuit 12 detects the state of exposure of a subject based upon the output video signal from the AGC circuit 8. This circuit comprises an integrating circuit which integrates the luminance level of the video signal over a prescribed period of time.

On the basis of the output signal from the AE detector circuit 12, the exposure control circuit 13 controls the diaphragm mechanism 2, the shutter speed of the electronic shutter controlled by the control circuit 6 and the gain of the AGC circuit 8.

An iris drive circuit 14 actuates a motor to drive the diaphragm mechanism 2 in dependence upon the output of the exposure control circuit 13, an exposure setting key 15 for setting exposure at the time of manual exposure control, and an exposure control automatic/manual selection key 16 for selecting the method of exposure control.

Operation within the exposure control circuit 13 is as follows: A mean luminance level outputted by the AE detector circuit 12 is supplied to an automatic exposure control circuit 13d, which is for automatic iris control. The circuit 13d compares the level signal with a reference signal and controls an AGC control circuit 13a, an electronic shutter control circuit 13b for varying storage time of the image sensing device and an iris control circuit 13c, thereby controlling the operating states of the AGC, electronic shutter and iris in such a manner that the luminance level of the video signal takes on a predetermined value.

Further, a manual exposure control circuit 13e performs manual control of the iris. Specifically, in response to operation of the exposure setting key 15, iris f-stop is read out of a look-up table (LUT) 13h and supplied to a comparator circuit 13g, which compares this value with f-stop information from the iris encoder 4. The comparator circuit 13g is so adapted as to output information conforming to the difference between the value obtained by operating the exposure setting key 15 and the f-stop from the iris encoder 4.

The iris control information outputted by the comparator circuit 13g is subjected to a prescribed exposure correction or a correction of diaphragm characteristic by a correction arithmetic circuit 13f, after which the corrected information is supplied to the iris control circuit 13c to drive the iris 2 via the iris drive motor 6.

As a result, the iris 2 is driven until the input value to the comparator circuit 13g, namely the f-stop of the iris, becomes equal to the f-stop set by the exposure setting key 15. This makes possible manual control of the iris.

Further, if switched to an A contact in response to operation of the exposure control automatic/manual selection key 16, a switch A/MSW selects the automatic exposure control circuit 13d. If switched to an M contact by the exposure control automatic/manual selection key 16, the switch A/MSW selects the manual exposure control circuit 13e.

In order to make it possible to obtain optimum video at various locations and under a variety of conditions by simple photography with the image sensing apparatus thus constructed, a change in exposure due to a change in the subject is detected from the video signal by means of the AE detector circuit 12, and, on the basis of the output signal from the AE detector circuit 12, the exposure control circuit 13 selects exposure control parameters for the diaphragm mechanism 2, the electronic shutter which controls the storage time of the image sensing device 3 and the gain of the AGC circuit 8 and decides the amount of correction to be applied to each of these parameters. As a result, control is carried out so as to obtain stable, optimum exposure at all times.

Thus, optimum exposure control can be performed automatically without any difficulty on the part of the photographer. Furthermore, the AE detector circuit 12 makes optimum photography possible by controlling photometric distribution based upon setting of the detection region or detection position of the video signal for exposure control.

For example, it is possible to perform so-called mean photometry, in which the entire video region is detected and exposure is controlled in such a manner that this detection signal takes on a constant level, or center-emphasizing photometry, in which only the central portion of the video region is detected and exposure is controlled in such a manner that this detection signal takes on a constant level.

Further, the AE detector circuit can perform exposure control based upon photometry that combines mean photometry and center-emphasizing photometry. This can be accomplished by weighting the detection data of the entire video region and the detection data of the region where center is emphasized, and performing exposure control based upon detection data obtained by adding these data at a fixed ratio. This compensates for the drawbacks of the individual photometric methods and provides even better exposure control.

Further, finer exposure control can be achieved by subdividing a scene into areas, detecting video in each area and limiting the areas of detection data used in exposure control or changing weighting.

However, even the photometric methods described above do not always provide a state of exposure control that is intended by the photographer.

For example, when a person is photographed in the presence of backlighting, the exposure of the person is affected by the brilliant background. This results noise (darkness). Conversely, when a person is photographed under strong frontlighting, as when the person is illuminated by a spotlight, the state of exposure results saturation.

Manual exposure correcting means have been proposed heretofore to allow the photographer to set exposure in order to deal with the photographic conditions mentioned above. So-called manual iris means will be described as one example of such manual exposure correcting means. The manual iris means maintains the state of the diaphragm mechanism 2 in a state set by the photographer, regardless of the detection signal from the AE detector circuit 12.

Specifically, the photographer selects automatic or manual for the exposure control method by the exposure control automatic/manual selection switch 16. If the manual exposure control method has been selected (i.e., if the A/MSW switch has been set to the M contact in FIG. 4), the control means within the exposure control circuit 13 is switched over to the manual exposure control circuit 13e.

The manual exposure control circuit 13e has the look-up table (LUT) 13h and the comparator circuit 13g which compares the LUT data with the detection signal from the iris encoder 4 that detects the opening degree of the iris. As shown at ① in FIG. 6, typical diaphragm states represented by F values from a fully open iris to a fully closed iris are set in the LUT 13h, and values from the iris encoder 4 corresponding to these F values are also set in the LUT.

While monitoring the screen of the EVF 11, the photographer uses the exposure setting key 15 to select the desired brightness of the subject. As a result, data to be read out of the LUT are selected in dependence upon the setting signal from the exposure setting key 15, and the comparator circuit 13g compares these data with the output signal of the iris encoder 4.

If there is a difference between the signals compared by the comparator circuit 13g, an amount of correction is calculated and the iris is controlled until the value from the iris encoder 4 becomes equal to the data read out of the LUT 13h.

Thus, it is possible for the exposure of the subject to be corrected to the brightness intended by the photographer. In this operation, the control values of the AGC and electronic shutter are set to fixed values that have been stored in the LUT 13h in advance or to control values which prevailed when the exposure control method was switched from automatic to manual. However, in a case where a set value is selected by the exposure setting key 15 in the same manner as the iris, a fine exposure setting in conformity with the photographic conditions is carried out.

However, regardless of the fact that the exposure correction is performed by the photographer using the manual exposure control means while the photographer observes the EVF 11 (FIG. 4) serving as monitoring means, generally the EVF 11 is made small enough to be observed by one eye. As a consequence, the size of the screen is small. Furthermore, in an EVF using liquid-crystal display means for the purpose of providing a color display, the dynamic range is insufficient. Thus, the small size of the screen and the characteristics of the liquid-crystal display means make it difficult to accurately discern the state of exposure of the subject. As a result, it is difficult to set the optimum exposure and a disparity can develop between the state of exposure intended by the photographer and the state of exposure actually set. Further, even if subject exposure intended by the photographer is achieved, the periphery of the subject results saturation or darkness, and the resulting video may have poor balance in terms of the exposure of the scene overall.

Furthermore, since complicated key operation is necessary, the photographer is required to have some degree of photographic experience. A photographer with little photographic experience cannot master operation with ease.

SUMMARY OF THE INVENTION

Accordingly, an object of the present invention is to provide an image sensing apparatus which solves the aforementioned problems encountered in the prior art.

According to the present invention, the foregoing object is attained by providing an image sensing apparatus having image sensing means for scanning a subject and outputting a video signal of the subject, comprising zone selecting means for selecting any zone from the video signal, exposure detection means for detecting a signal conforming to exposure of the zone, exposure control means for controlling exposure based upon the signal, and exposure maintaining means for maintaining a value relating to exposure which prevails when control by the exposure control means is optimized, wherein state of control of exposure by the exposure control means is maintained based upon the value relating to exposure stored by the exposure maintaining means.

As a result, an optimum image conforming to various subjects and photographic conditions is obtained while maintaining optimum balance between the state of exposure, intended by the photographer, of the zone of the subject, and the state of exposure at the periphery of the subject.

The image sensing apparatus further comprises selected-zone detection means for determining whether the video signal captured by the image sensing means contains a video signal of the zone upon elapse of a prescribed period of time, and outputting a signal which nullifies maintenance, by the exposure maintaining means, of the value relating to exposure if the video signal of the zone is not contained.

Alternatively, the image sensing apparatus further comprises memory means for storing a video signal of the zone, and selected-zone detection means for determining whether a zoomed video signal captured by the image sensing means contains the video signal of the zone stored in the memory means, and outputting a signal which nullifies maintenance, by the exposure maintaining means, of the value relating to exposure if the video signal of the zone is not contained.

In a case where a zone of the subject intended by the photographer is not contained in a newly captured video signal upon elapse of a prescribed period of time or as the result of zooming, holding of exposure is suspended, thereby making it possible to deal rapidly with a change in photographic conditions.

Furthermore, if the value relating to exposure is outside a prescribed range of values stored in advance, the exposure maintaining means selects an upper-limit value or a lower-limit value of the prescribed range of values as the value relating to exposure.

This makes it possible to prevent a deterioration in the balance of overall exposure of the scene caused by improper exposure at the periphery of the subject and the occurrence of saturation or darkness even though the intended zone of the subject is properly exposed.

According to another aspect of the present invention, the foregoing object is attained by providing an image sensing apparatus having display means for displaying an image signal, comprising a pointing device for selecting any zone in a screen displayed by the display means, adjusting means for applying a prescribed adjustment to a video signal of the zone, a memory for storing adjusting data obtained from the adjusting means, and control means which, when adjustment by the adjusting means has attained a prescribed state, is for storing the adjusting data prevailing at this time in the memory.

Further, when the adjustment by the adjusting means has attained a prescribed state, the control means maintains the state of adjustment prevailing at this time.

As a result, an optimum image conforming to various subjects and photographic conditions is obtained while maintaining optimum balance between the state of exposure, intended by the photographer, of the zone of the subject, and the state of exposure at the periphery of the subject.

More specifically, the pointing device is a line-of-sight detecting device for detecting position of a photographer's line of sight directed toward the screen. A mouse or a track ball may also be used as the pointing device.

Further, the adjusting means adjusts exposure of the image sensing device by adjusting f-stop, a shutter and gain.

Further, the screen is a monitor screen of an electronic viewfinder. If the photographer merely designates an intended zone of a subject, the exposure is adjusted to the optimum state automatically. As a result, the photographer is freed from having to gaze steadily at the monitor screen. This makes it possible to use an electronic viewfinder having a sufficiently small monitor screen, thus contributing to a reduction in the size of the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram showing examples of look-up tables;

DESCRIPTION OF THE PREFERRED EMBODIMENTS

Embodiments of the present invention will now be described with reference to the drawings.

First Embodiment

Figure 1:
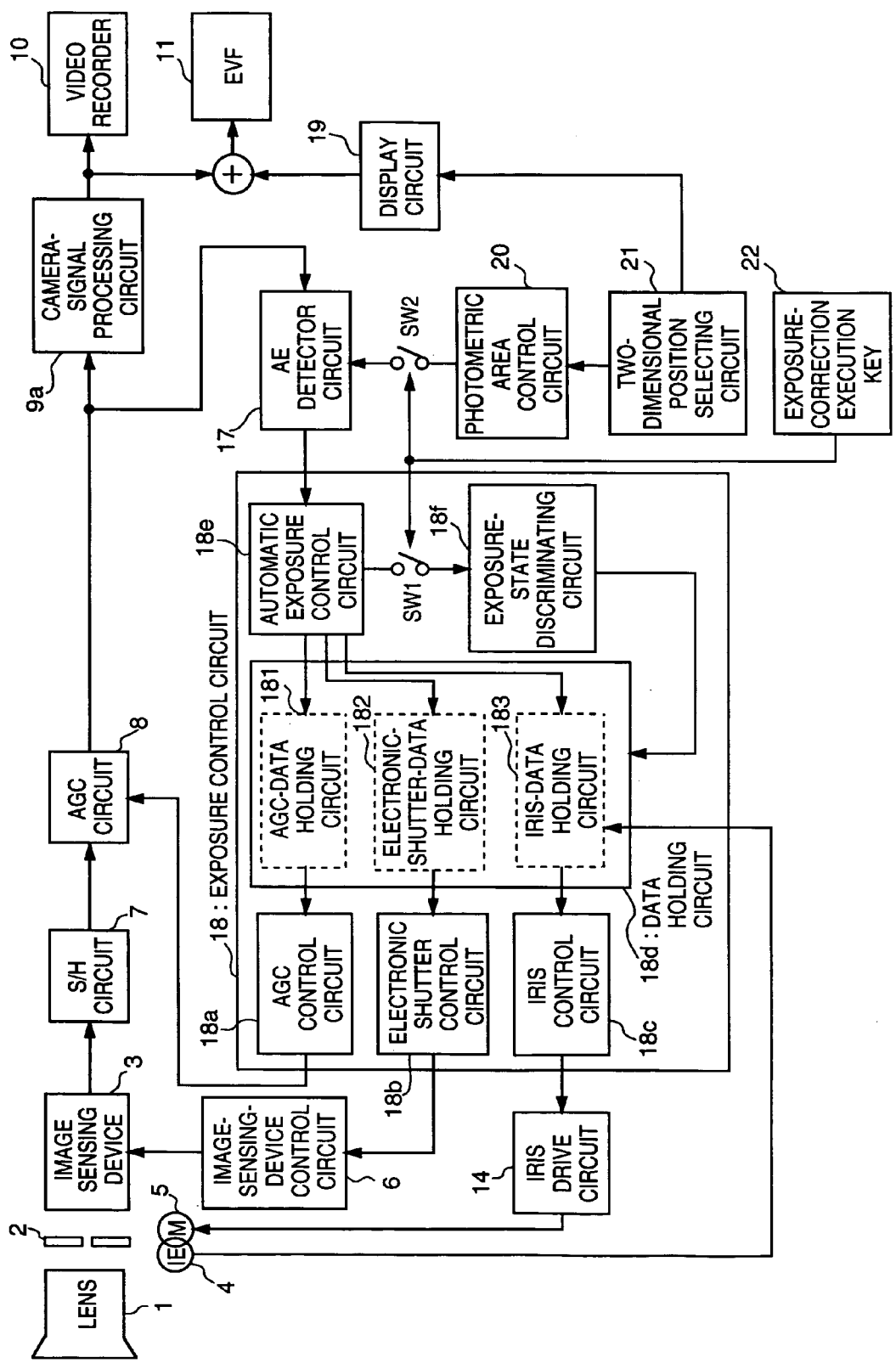
FIG. 1 is a block diagram illustrating the construction of an image sensing apparatus according to a first embodiment of the present invention.

FIG. 1 is a block diagram illustrating the construction of an image sensing apparatus according to a first embodiment of the present invention. Components identified by reference characters identical with those of the prior-art example shown in FIG. 4 have similar functions and need not be described in detail again.

Figure 4:
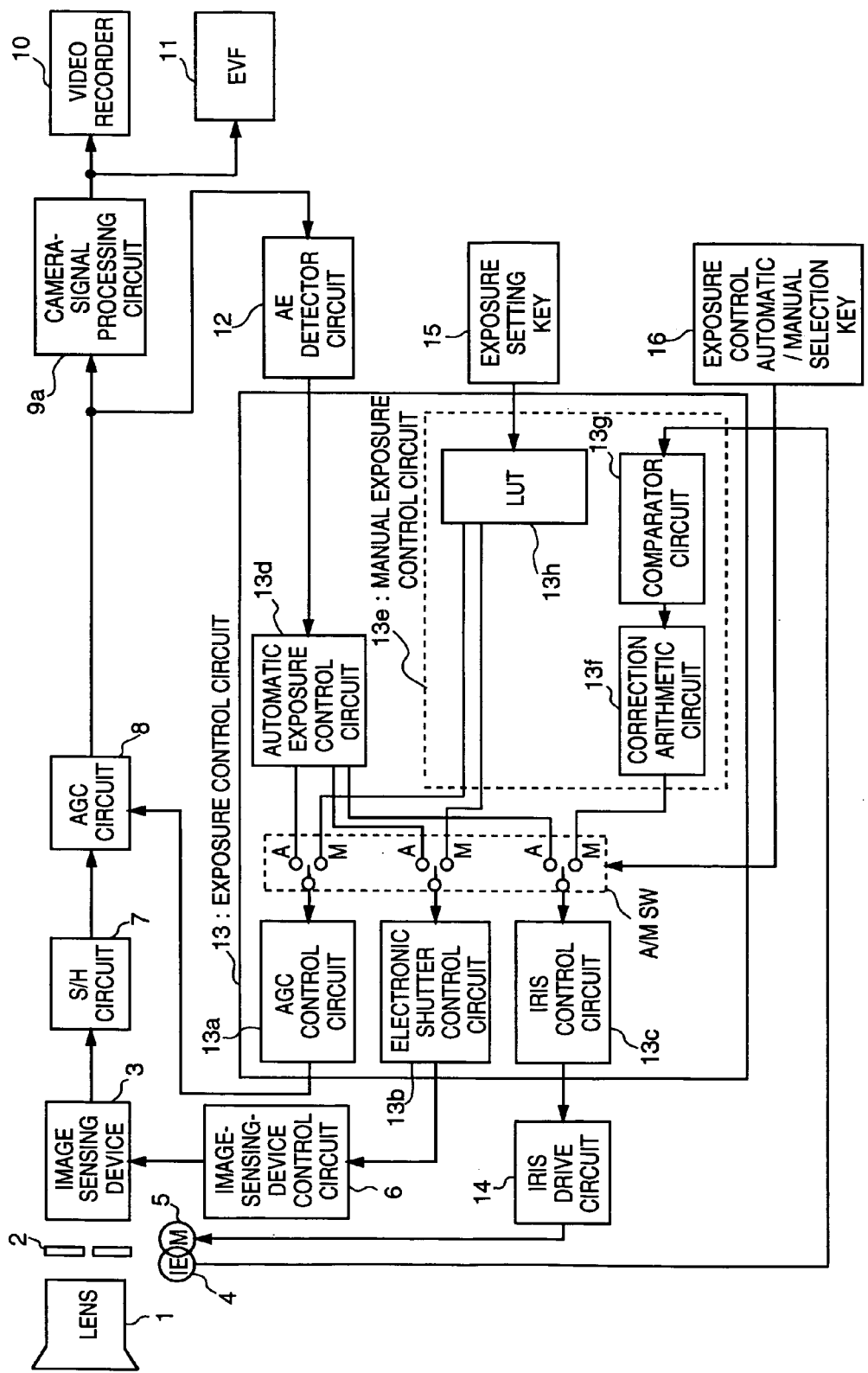
FIG. 4 is a block diagram illustrating the construction of an image sensing apparatus according to the prior art.

The apparatus of FIG. 1 differs from that of FIG. 4 in the provision of two-dimensional position selecting means 21, photometric area control means 20 and an exposure-correction execution key 22, and in that the functions of an AE detector circuit 17 and exposure control circuit 18 are different. In other aspects the process through which the video signal is processed is similar to that of the prior art (FIG. 4).

Ordinarily, control is similar to that of the prior art shown in FIG. 4. Specifically, a change in exposure due to a change in the subject is detected from the video signal by means of the AE detector circuit 17, and, on the basis of the output signal from the AE detector circuit 17, the exposure control circuit 18 selects exposure control parameters for the diaphragm mechanism (iris) 2, the electronic shutter which controls the storage time of the image sensing device 3 and the gain of the AGC circuit 8 and decides the amount of correction to be applied to each of these parameters. As a result, control is carried out so as to obtain stable, optimum exposure at all times.

Operation within the exposure control circuit 18 is as follows: A mean luminance level outputted by the AE detector circuit 17 is supplied to an automatic exposure control circuit 18e, which is for automatic iris control. The circuit 18e compares the level signal with a reference signal and controls an AGC control circuit 18a, an electronic shutter control circuit 18b for varying storage time of the image sensing device and an iris control circuit 18c, thereby controlling the operating states of the AGC, electronic shutter and iris in such a manner that the luminance level of the video signal takes on a predetermined value.

Provided between the automatic exposure control circuit 18e and the AGC control circuit 18a, electronic shutter control circuit 18b and iris control circuit 18c is data holding unit 18d, which has an AGC-data holding circuit 181, an electronic-shutter-data holding circuit 182 and an iris-data holding circuit 183 for holding the control data of the circuits 18a, 18b and 18c, respectively.

Further, a switch SW1 (described below) is turned on only when a switch SW2 (described below) is turned on, as a result of which an exposure-state discriminating circuit 18f determines, based upon the result of calculation performed by the automatic exposure control circuit 18e, whether the properly exposed state has been achieved. In case of proper exposure, the circuit 18f outputs a control signal which places the data holding circuit 18d in the hold ON state. Here a properly exposed state is a preset prescribed luminance level for the image signal. More specifically, this is a state in which a luminance level corresponding to the interior of a photometric frame is discriminated to be the prescribed luminance level.

Accordingly, in order to make it possible to obtain optimum video at various locations and under a variety of conditions by simple photography with the image sensing apparatus thus constructed, a change in exposure due to a change in the subject is detected from the video signal by means of the AE detector circuit 17, and, on the basis of the output signal from the AE detector circuit 17, the exposure control circuit 18 selects exposure control parameters for the diaphragm mechanism 2, the electronic shutter which controls the charge storage time of the image sensing device 3 and the gain of the AGC circuit 8 and decides the amount of correction to be applied to each of these parameters. As a result, control is carried out so as to obtain optimum exposure at all times.

The two-dimensional position selecting means 21 may be any means that allows the photographer to designate horizontal and vertical positions in a two-dimensional plane while observing the screen of the EVF 11. Examples include a line-of-sight detecting device for detecting a point on the screen at which the photographer stares, or auxiliary input means such as a joystick, track ball, mouse or touch panel. The designated position selected by the two-dimensional position selecting circuit 21 is supplied to a display circuit 19 so that a prescribed indicator (e.g., a frame display or cursor display) is superimposed on the screen of the EVE 11.

The photometric area control means (circuit) 20 is for setting a photometric area at the position on the screen designated by the two-dimensional position selecting circuit 21. By turning a gate circuit within the AE detector circuit 17 ON/OFF, only an output within the AE detector circuit 17 corresponding to the position designated by the two-dimensional position selecting circuit 21 is allowed to pass.

The exposure-correction execution key 22 is turned ON or OFF, thereby turning ON or OFF the switch SW2, which is provided between the AE detector circuit 17 and the photometric area control circuit 20, and the switch SW1, which is provided between the automatic exposure control circuit 18e and exposure-state discriminating circuit 18f.

When the exposure-correction execution key 22 is in the OFF state, the switch SW2 is in the OFF state. As a result, the AE detector circuit 17 is cut off from the photometric area control circuit 20 and outputs photometric information of a fixed photometric area. Since the switch SW1 also is turned OFF, the output signal which controls the data holding circuit 18d becomes a hold OFF signal. As a result, a state is attained in which the correction of the exposure control parameters is carried out by following up the change in the video signal in the same manner that automatic exposure control is performed in the prior art described above in conjunction with FIG. 4. Optimum exposure control is thus performed automatically.

Next, the details of manual exposure correction processing, which is a characterizing feature of the present invention, will be described.

As set forth above, the present invention is provided with the two-dimensional position selecting circuit 21, which is capable of selecting at least a portion of the video signal, and the display circuit 19 for displaying the image position, selected by the two-dimensional position selecting circuit 21, on the screen of the EVF 11 serving as the monitor.

There is an arrangement in which input means such as a joystick, track ball, mouse or touch panel is adopted as the two-dimensional position selecting circuit 21, as well as an arrangement in which the input means enters a point on the screen of the EVF 11 at which the photographer stares. This input is made using staring-point position detecting means for detecting position information indicative of the point on the screen of the EVF 11 at which the photographer is staring.

Figure 7:
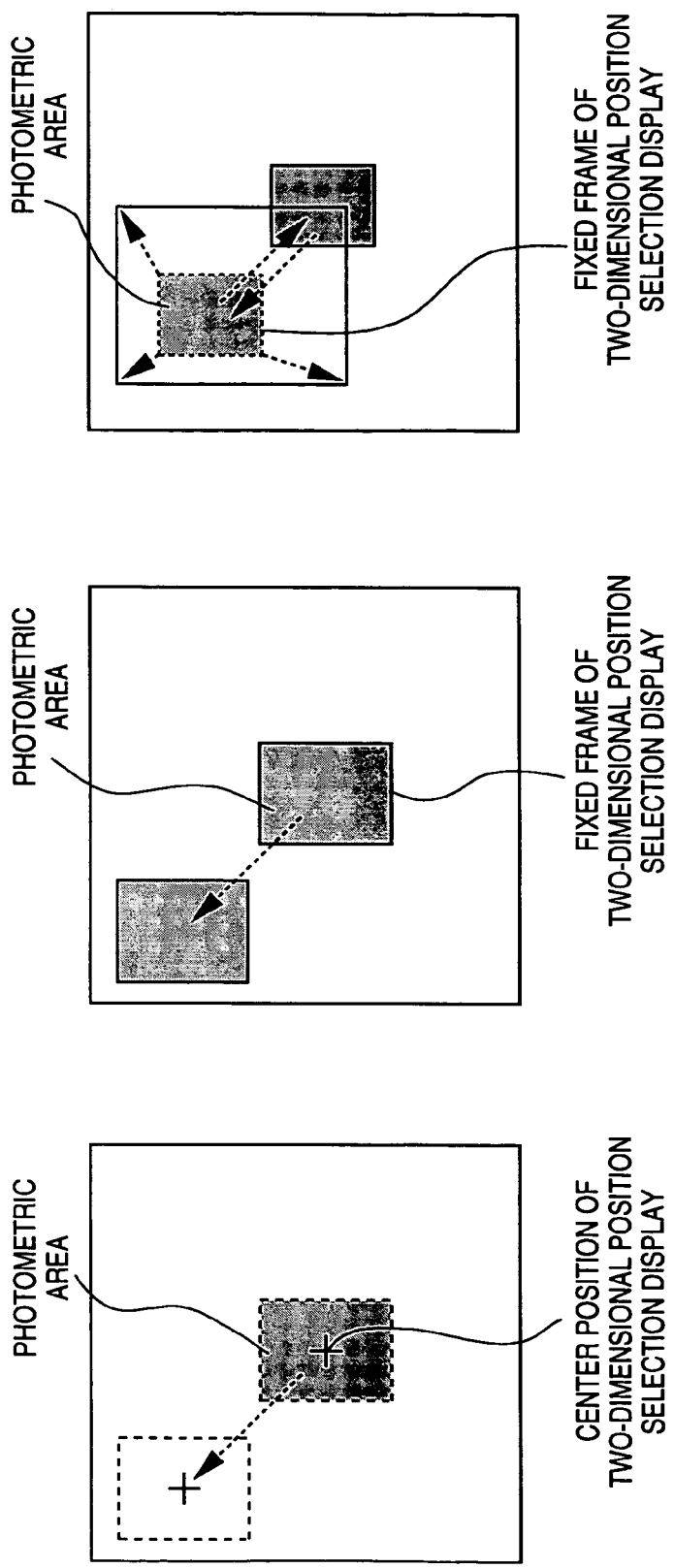
FIG. 7A–7C are diagrams showing display of a selected position by a two-dimensional position selecting circuit according to the present invention, as well as an area in which photometry is performed.

Further, an arrangement may be adopted in which, as shown at ① in FIG. 7, the center position (indicated by the cross) of the subject desired to be selected is chosen, or in which, as shown at ② in FIG. 7, a video zone designated in advance is indicated by a fixed frame and the position of the fixed frame is selected and set in such a manner that the subject falls within the fixed frame, or in which, as shown in ③ of FIG. 7, the position of the subject is selected and, moreover, the video zone can be freely selected to conform to the size of the subject.

The description that follows will focus on case ② above, namely the arrangement in which a video zone designated in advance is indicated by a fixed frame and the position of the fixed frame is selected and set in such a manner that the subject falls within the fixed frame.

In a case where optimum exposure cannot be achieved (e.g., the subject appears darkness because of backlighting or saturation because of excessive frontlighting) with automatic exposure control in the arrangement described above, the photographer uses the two-dimensional position selecting circuit 21 to set the fixed frame at the position of the subject for which optimum exposure is desired.

The position signal from the two-dimensional position selecting circuit 21 enters the photometric area control circuit 20, which proceeds to control the photometric area for the purpose of detecting the state of exposure of the video zone corresponding to the position of the fixed frame selected by the two-dimensional position selecting circuit 21.

In the case where the two-dimensional position selecting circuit 21 is so adapted as to be capable of selecting not only the position of the subject but also the video zone in conformity with the size of the subject, as shown in ③ of FIG. 7, photometric area control is carried out so as to control not only the position of the photometric area in accordance with the position selected by the two-dimensional position selecting circuit 21 but also a photometric zone in accordance with the selected video zone.

At this stage, however, the switch SW2 is in the OFF state and the output signal from the photometric area control circuit 20 does not enter the AE detector circuit 17. The switch S2 is controlled by the output signal of the exposure-correction execution key 22. The exposure-correction execution key 22 is one input means which, after the position of the fixed frame is set by the two-dimensional position selecting circuit 21 at the position of the subject desired to be subjected to an exposure correction, the photographer uses to enter a trigger signal when the photographer desires to start the exposure correction operation. The switch SW2 is turned ON when the trigger signal enters from the exposure-correction execution key 22. When the switch SW2 is turned ON, the state of exposure of the video zone corresponding to the photometric area set by the photometric area control circuit 20 is detected by the AE detector circuit 17. In accordance with the detection signal within the photometric area set by the two-dimensional position selecting circuit 21, the automatic exposure control circuit 18e of the exposure control circuit 18 selects exposure control parameters for the diaphragm mechanism (iris) 2, the electronic shutter which controls the charge storage time of the image sensing device 3 and the gain of the AGC circuit 8 and decides the amount of correction to be applied to each of these parameters. As a result, control is carried out so as to obtain stable, optimum exposure at all times.

Meanwhile, the trigger signal from the exposure-correction execution key 22 also turns on the switch SW1 of the exposure control circuit 18 so that the result of calculation from the automatic exposure control circuit 18e enters the exposure-state discriminating circuit 18f.

Based upon the result of calculation from the automatic exposure control circuit 18e, the exposure-state discriminating circuit 18f determines, only when the switch SW1 is ON, whether a properly exposed state has been attained. If the exposure-state discriminating circuit 18f determines that the properly exposed state has been attained, the circuit 18f outputs a control signal which places the data holding circuit 18d in the hold ON state.

When the switch SW1 is OFF, or if the result of the determination made by the exposure-state discriminating circuit 18f is that the state of exposure is not proper, the circuit 18f outputs a control signal which places the data holding circuit 18d in the hold OFF state.

In dependence upon the control signal from the exposure-state discriminating circuit 18f, the data holding circuit 18d executes control as to whether or not to hold the exposure control parameters such as the iris control value, electronic shutter control value and AGC control value, as well as the correction values for these parameters, calculated by the automatic exposure control circuit 18e.

In the hold OFF state (the state in which switch SW1 is OFF), the iris control value, electronic shutter control value and AGC control value, as well as the correction values for these parameters, calculated by the automatic exposure control circuit 18e are outputted as is to the iris control circuit 18c, electronic shutter control circuit 18b and AGC control circuit 18a so that the correction operation is carried out while following up changes in the video signal.

In the hold ON state (the state in which switch SW2 is ON), the iris control value, electronic shutter control value and AGC control value, as well as the correction values for these parameters, which prevail at the instant the hold ON signal is outputted by the exposure-state discriminating circuit 18f, are stored in memory, and the stored values are outputted to the iris control circuit 18c, electronic shutter control circuit 18b and AGC control circuit 18a irrespective of any change in the brightness of the subject.

Figure 5:
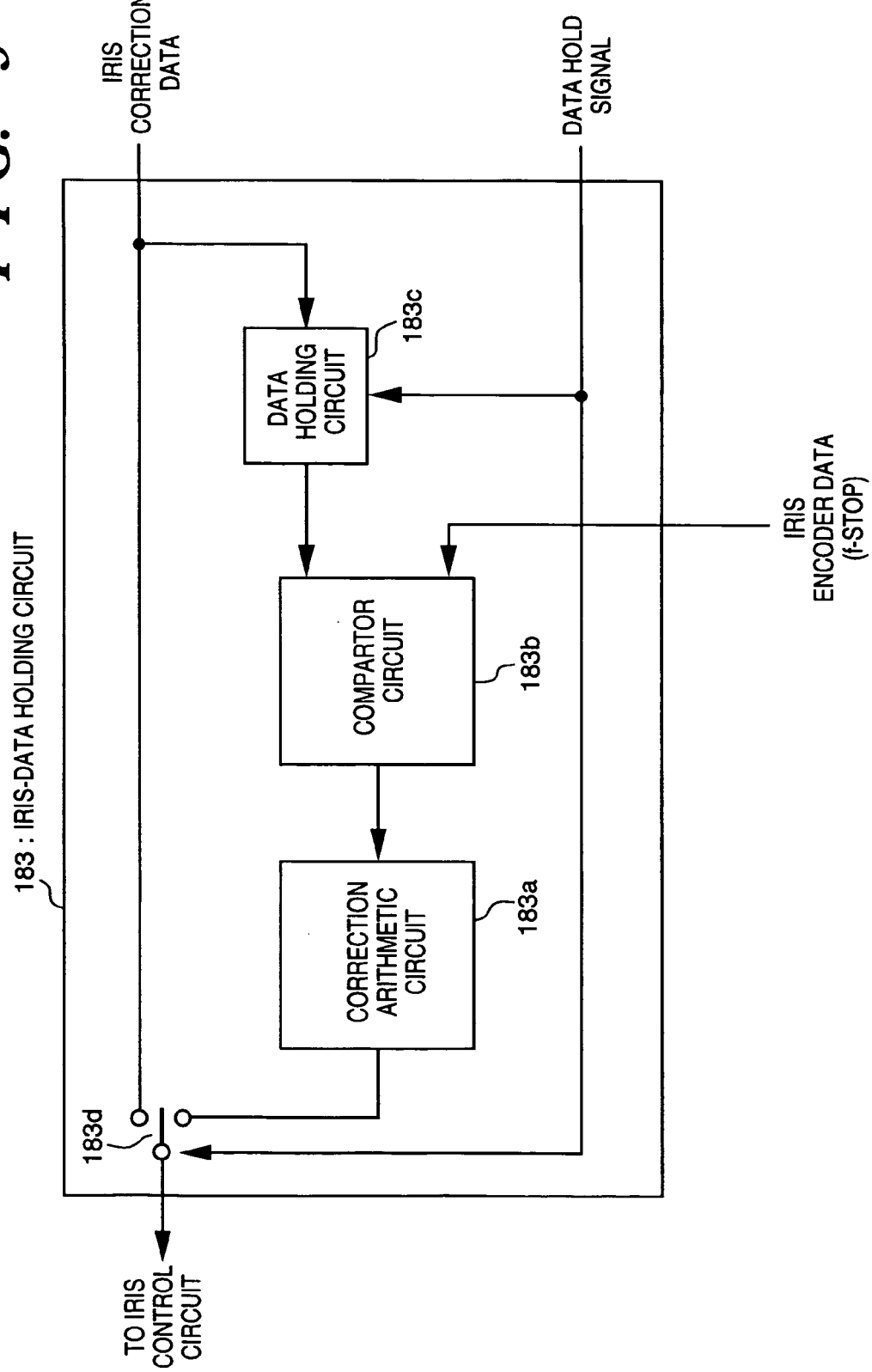
FIG. 5 is a block diagram showing the construction of an iris data holding circuit according to the first embodiment of the present invention.

Here it will suffice if the iris-data holding circuit 183 holds the control data in a case where means for controlling the diaphragm vanes driven by a stepping motor or for controlling the amount of transmitted light as by liquid crystal is used as the diaphragm mechanism. However, in a case where use is made of means such as diaphragm vanes employing an IG meter, it is necessary to detect the state of the iris and apply feedback control. An arrangement for achieving this is as shown in FIG. 5.

Specifically, after iris correction data calculated by the automatic exposure control circuit 18e have been held by a data holding circuit 183c within the iris-data holding circuit 183 in response to the data hold signal, the data are compared with an f-stop from the iris encoder 4. A correction arithmetic circuit 183a calculates a correction value based upon the difference between the compared signals and outputs the correction value to the iris control circuit 18c. In other words, the diaphragm mechanism 2 is controlled in such a manner that the data outputted by the data holding circuit 183c and the data from the iris encoder become equal. It should be noted that the correction value is outputted to the iris control circuit 18c via a switch 183d changed over by the data hold signal.

Thus, when the trigger signal enters from the exposure-correction execution key 22, the correction operation is started so that the state of exposure of the video zone, i.e., of the photometric area, selected by the two-dimensional position selecting circuit 21 will be optimized. The correction operation continues until the exposure-state discriminating circuit 18f determines that the optimum state of exposure has been attained.

If it is determined that the optimum state of exposure has been attained, the correction operation is terminated and the data holding circuit 18d is placed in the hold ON state to maintain the optimum exposure control state. As a result, even if the zoom magnification is changed and the peripheral brightness changes, the exposure of the subject selected by the two-dimensional position selecting circuit 21 is held in the optimum state. It should be noted that an arrangement may be adopted in which a switch operated when the trigger signal from the exposure-correction execution key 22 enters may be provided as indicated by switch SW3 in FIG. 13, with the photometric area control circuit 20 being operated only when the switch SW3 is ON. (The operation timing of the switch SW3 would be the same as that of switch SW2 in FIG. 1.)

Thus, according to the present invention as described above, the photographer selects the video zone of the subject in which the optimum state of exposure is desired to be obtained. The brightness of the selected video zone is detected in response to the selection and the input of the trigger signal at the timing at which a correction is desired to be applied to the exposure, and it is determined whether the optimum state of exposure has been attained. While this is being carried out, the exposure correction operation is performed and, when the state of exposure of the selected video zone has been corrected to the optimum state, the state of exposure at this time is held. This series of correction operations is performed automatically.

First Modification of First Embodiment

Figure 2:
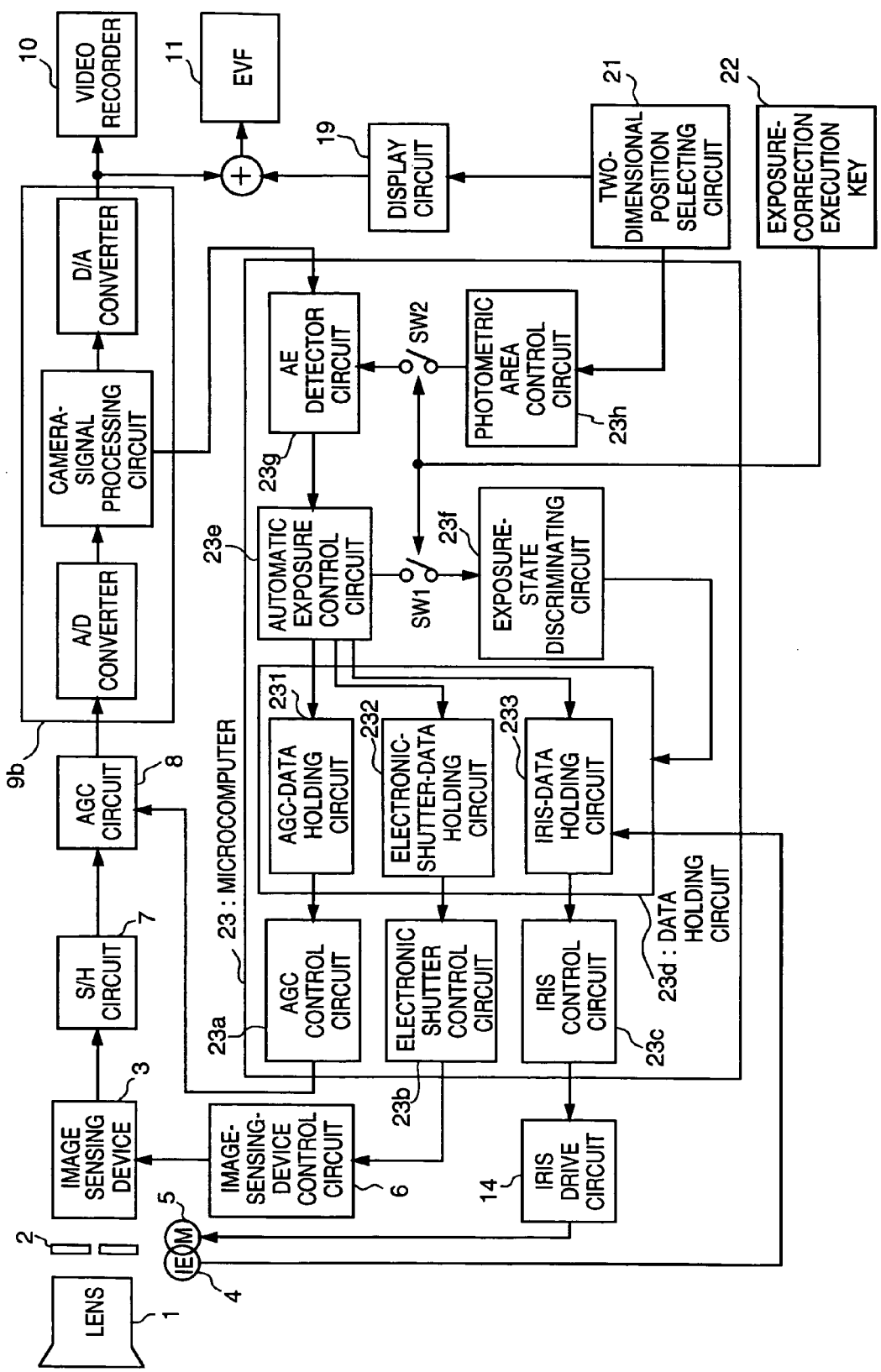
FIG. 2 is a block diagram illustrating the construction of an image sensing apparatus according to a first modification of the first embodiment of the present invention.

FIG. 2 is a block diagram illustrating the construction of an image sensing apparatus according to a first modification of the first embodiment of the present invention.

In the first modification of first embodiment, the camera-signal processing circuit 9a in FIG. 1 of the first embodiment is made a camera-signal processing circuit 9b that is capable of digital signal processing. Specifically, the camera-signal processing circuit 9b converts the input video signal to a digital signal, subjects the digital signal to prescribed processing, converts the resulting signal back to an analog signal and then outputs the analog signal.

This arrangement differs from the first embodiment in that the exposure control circuit is implemented by a microcomputer 23, and the AE detector circuit 17 and two-dimensional position selecting circuit 21 of the first embodiment are incorporated in the microcomputer 23 as a AE detector circuit 23g and a two-dimensional position selecting circuit 23h. As a result, the processing operations performed in the first embodiment can be carried out in the form of digital signals within the microcomputer 23, thus allowing these operations to be executed by a simple arrangement.

The circuit functions of other circuits 23a~23f are similar to the circuit functions of the circuits 18a~18f, respectively, and the exposure correction method per se is similar to that of the first embodiment. Components identified by reference characters identical with those of the prior-art example shown in FIG. 4 and the first embodiment shown in FIG. 1 have similar functions and need not be described in detail again.

Second Modification of First Embodiment

In the first embodiment and the first modification of the first embodiment, it is described that at execution of the exposure correction according to the present invention, the selection of optimum control parameters for exposure correction and the amount of correction applied to these control parameters are decided using the diaphragm mechanism 2, the electronic shutter function for controlling the charge storage time of the image sensing device 3 and AGC circuit 8 as exposure control parameters, and the value of each control parameter is held when the optimum state of exposure has been attained. However, it is not always necessary to use the aforesaid three control parameters in the exposure correction operation. The exposure correction operation can be achieved using one control parameter or a combination of two control parameters.

In this modification, a case will be described in which only the diaphragm mechanism 2 is used as an exposure control parameter employed at the time the exposure correction of the present invention is executed.

The operation of this modification differs from that of the first embodiment in that when the trigger signal enters from the exposure-correction execution key 22, the control values of the control parameters for the electronic shutter and AGC are fixed either at the instantaneous data prevailing when the trigger signal enters from the exposure-correction execution key 22 or at data that have been set in advance, and solely the diaphragm mechanism 22 is used to perform the exposure control operation in such a manner that the state of exposure of the video zone selected by the two-dimensional position selecting circuit 21 is optimized.

When the exposure-state discriminating circuit 18f determines that the optimum state of exposure has been attained, the correction operation performed by the iris is terminated and the data holding circuit 18d is placed in the hold ON state to hold only the iris data.

This modification thus makes it possible to simplify both the structure and processing. Other components identified by reference characters identical with those of the prior-art example shown in FIG. 4 and the first embodiment shown in FIG. 1 have similar functions and need not be described in detail again.

Third Modification of First Embodiment

Figure 3:
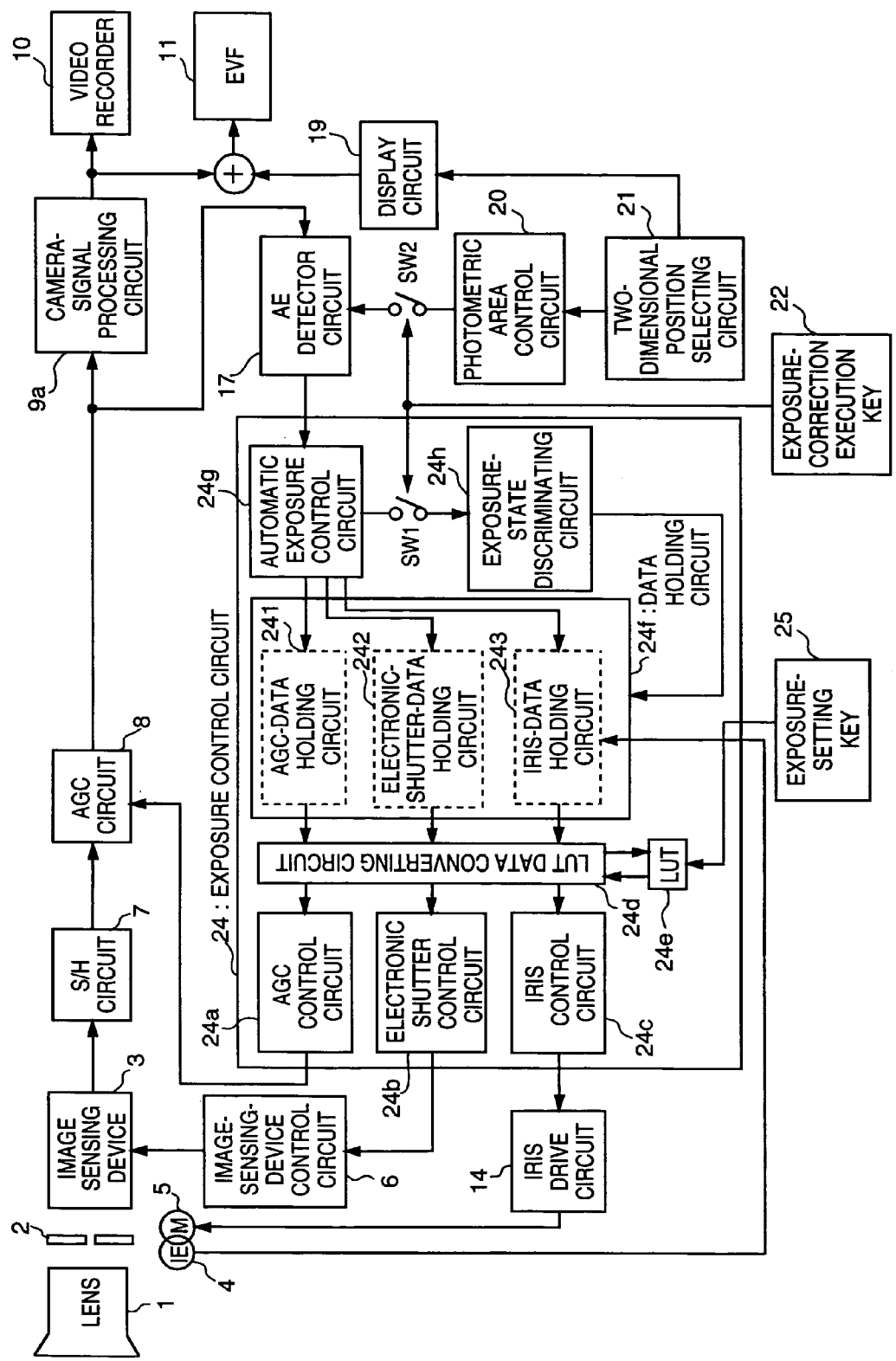
FIG. 3 is a block diagram illustrating the construction of an image sensing apparatus according to a third modification of the first embodiment of the present invention.

FIG. 3 is a block diagram illustrating the construction of an image sensing apparatus according to a third modification of the first embodiment of the present invention. This differs from the first embodiment of FIG. 1 in the construction of an exposure control circuit 24.

The exposure control circuit 24 has circuit components 24a~24c corresponding to the circuits 18a~18c, respectively, of FIG. 1. The circuits 18d, 18e and 18f of FIG. 1 correspond to the circuits 24f, 24g and 24h, respectively, of FIG. 3.

The exposure control circuit 24 in this modification differs from the exposure control circuit 18 in the first embodiment. A LUT data converting circuit 24d and a LUT 24e, in which data indicative of exposure control parameters have been stored in the manner shown at ② in FIG. 6, are provided between a data holding circuit 24f and an iris control circuit 24c, AGC control circuit 24a and electronic shutter control circuit 24b.

Further, an exposure setting key 25 is provided. The state of exposure of a selected video zone is automatically corrected to the optimum state in the same manner as in the first embodiment, and it is possible to perform a resetting by the exposure setting key 25, based upon the held state, in the manner of the conventional manual iris. Components identified by reference characters identical with those of the prior-art example shown in FIG. 4 and the first embodiment shown in FIG. 1 have similar functions and need not be described in detail again.

Though the arrangement of the first embodiment has been cited as the basic arrangement, it is also possible to apply the foregoing to the arrangements of the first and second modifications in the same manner.

Second Embodiment

Figure 8:
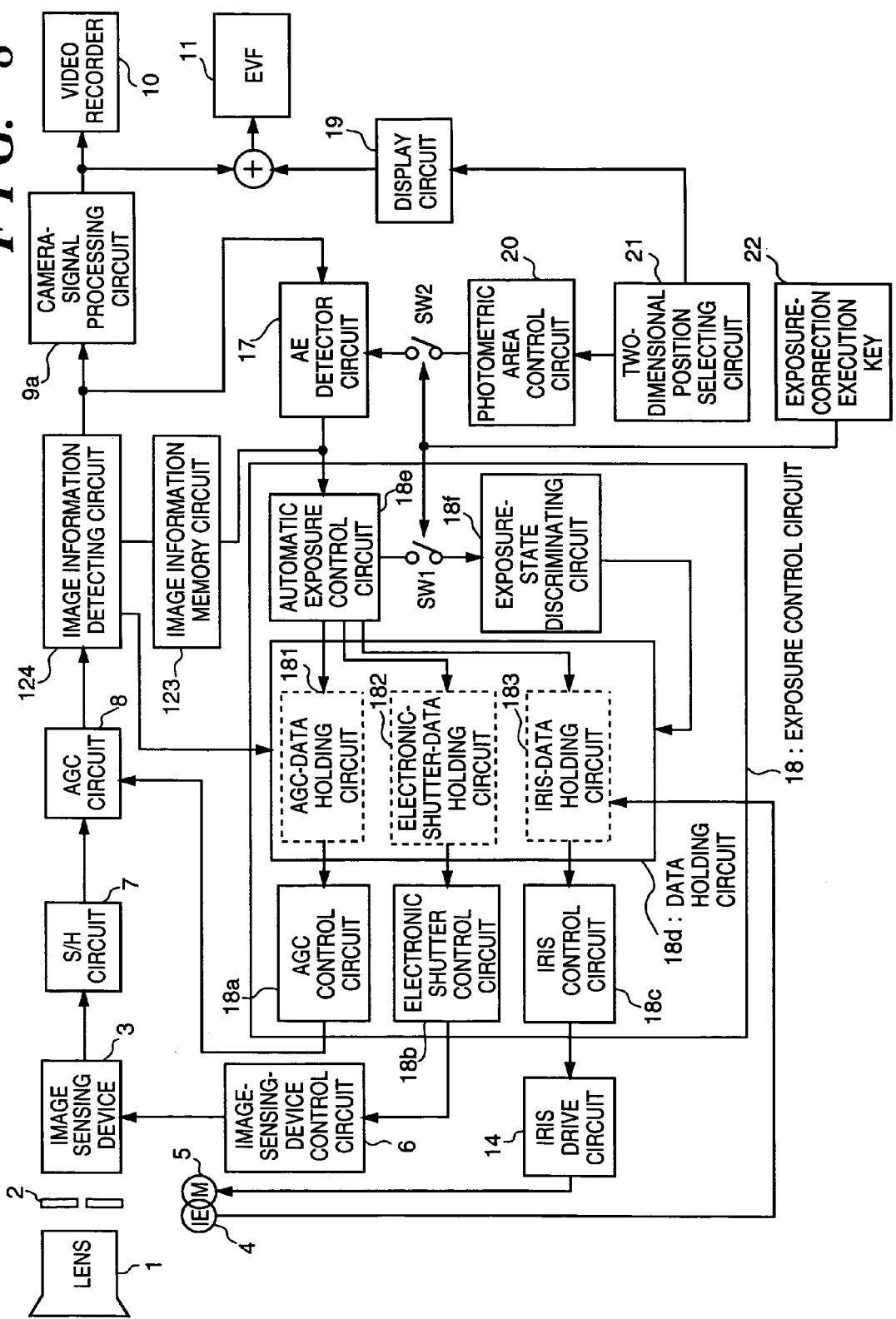
FIG. 8 is a block diagram illustrating an image sensing apparatus according to a second embodiment and a first modification thereof according to the present invention.

A second embodiment of the invention will now be described with reference to FIG. 8, which is a block diagram of an image sensing apparatus according to the present invention. Elements corresponding to those in FIG. 1 of the first embodiment and FIG. 4 of the prior art are designated by like reference characters. The functions of the elements identified by like reference characters are the same as in first embodiment and need not be described again. In this embodiment, the arrangement of the image sensing apparatus of the first embodiment is further provided with an image information memory circuit 123 serving as means for storing image information, and an image information detecting circuit 124 serving as means for determining whether image information exists.

The operation of the second embodiment will now be described. Using the two-dimensional position selecting circuit 21, the photographer sets the fixed frame at the position of the subject for which the optimum state of exposure is desired. The signal representing the set position of the fixed frame enters the photometric area control circuit 20 from the two-dimensional position selecting circuit 21, and the photometric area control circuit 20 proceeds to control the photometric area in order to detect the state of exposure of the video zone with regard to the set position of the fixed frame. In the case where the two-dimensional position selecting circuit 21 is so adapted as to be capable of selecting not only the position of the subject but also the video zone in conformity with the size of the subject, as shown in ③ of FIG. 7, photometric area control is carried out so as to control not only the position of the photometric area in accordance with the position selected by the two-dimensional position selecting circuit 21 but also a photometric zone in accordance with the selected video zone. At this stage the switch SW2 is in the OFF state and the output signal from the photometric area control circuit 20 does not enter the AE detector circuit 17. The switch SW2 is controlled by the output signal of the exposure-correction execution key 22. After the position of the photometric area is set by the two-dimensional position selecting circuit 21 at the position of the subject desired to be subjected to an exposure correction, the photographer uses the exposure-correction execution key 22 to enter the trigger signal at the instant the start of the exposure correction operation is desired. The switch SW2 is turned ON when the trigger signal enters from the exposure-correction execution key 22. When the switch SW2 is turned ON, the state of exposure of the video zone corresponding to the photometric area set by the photometric area control circuit 20 is detected by the AE detector circuit 17. In accordance with the detection signal from the AE detector circuit 17, the automatic exposure control circuit 18e of the exposure control circuit 18 selects exposure control parameters for the diaphragm mechanism (iris) 2, the electronic shutter which controls the charge storage time of the image sensing device 3 and the gain of the AGC circuit 8 and decides the amount of correction to be applied to each of these parameters. As a result, control is carried out so as to obtain stable, optimum exposure at all times.

Meanwhile, the trigger signal from the exposure-correction execution key 22 also turns on the switch SW1 of the exposure control circuit 18 so that the result of calculation from the automatic exposure control circuit 18e enters the exposure-state discriminating circuit 18f. Based upon the result of calculation from the automatic exposure control circuit 18e, the exposure-state discriminating circuit 18f determines, only when the switch SW1 is ON, whether a properly exposed state has been attained. If the exposure-state discriminating circuit 18f determines that the properly exposed state has been attained, the circuit 18f outputs a control signal which places the data holding circuit 18d in the hold ON state. When the switch SW1 is OFF, or if the result of the determination made by the exposure-state discriminating circuit 18f is that the state of exposure is not proper, the circuit 18f outputs a control signal which places the data holding circuit 18d in the hold OFF state.

In dependence upon the control signal from the exposure-state discriminating circuit 18f, the data holding circuit 18d executes control as to whether or not to hold the exposure control parameters such as the iris control value, electronic shutter control value and AGC control value, as well as the correction values for these parameters, calculated by the automatic exposure control circuit 18e. In the hold OFF state, the iris control value, electronic shutter control value and AGC control value, as well as the correction values for these parameters, calculated by the automatic exposure control circuit 18e are outputted as is to the iris control circuit 18c, electronic shutter control circuit 18b and AGC control circuit 18a so that the correction operation is carried out while following up changes in the video signal. In the hold ON state, the iris control value, electronic shutter control value and AGC control value, as well as the correction values for these parameters, which prevail at the instant the hold ON signal is outputted by the exposure-state discriminating circuit 18f, are stored in memory, and the stored values are outputted to the iris control circuit 18c, electronic shutter control circuit 18b and AGC control circuit 18a irrespective of any change in the brightness of the subject.

Thus, when the trigger signal enters from the exposure-correction execution key 22, the correction operation is started so that the state of exposure of the video zone selected by the two-dimensional position selecting circuit 21 will be optimized. The correction operation continues until the exposure-state discriminating circuit 18f determines that the optimum state of exposure has been attained. If it is determined that the optimum state of exposure has been attained, the correction operation is terminated and the data holding circuit 18d is placed in the hold ON state to maintain the optimum exposure control state.

Next, according to this embodiment, the video signal detected by the AE detector circuit 17 is stored in the image information memory circuit 123 at the same time. This is subsequently compared with the entire image of the subject by the image information detecting circuit 124 at a period set in advance. If the video zone that has been stored in the image information memory circuit 123 is not present in the entire image of the subject, the image information detecting circuit 124 generates a hold OFF signal to reset the data holding circuit 18d.

The image information memory circuit 123 may have any construction that is capable of storing image data. This may be a digital semiconductor memory in a case where the signal processing performed by the circuitry from the AGC circuit 8 onward is digital or an analog semiconductor memory in a case where the signal processing performed by the circuitry from the AGC circuit 8 onward is analog. There is no particular limitation upon the method used by the image information detecting circuit 124 to perform the comparison by which it is determined whether the video signal zone stored in the image information memory circuit 123 exists in the image of the present subject. For example, the method may be one in which the contours of the images are compared and the images are judged to be the same if there are fixed points of similarity. Another method is to make a judgment based upon the hue of a color signal.

First Modification of Second Embodiment

A first modification of the second embodiment will now be described. Since the block diagram of this modification is the same as that of FIG. 8 illustrating the second embodiment, the individual elements need not be described in detail again. According to the second embodiment, the video zone stored in the image information memory circuit 123 and the entire image of the subject are compared by the image information detecting circuit 124 at a period set in advance, and the image information detecting circuit 124 generates the hold OFF signal to reset the data holding circuit 18d if the video zone stored in the image information memory circuit 123 is not present in the entire image of the subject.

By contrast, the first modification is so adapted that the video zone stored in the image information memory circuit 123 and the entire image of the subject are compared by the image information detecting circuit 124 during or after a zooming operation in the image sensing apparatus, and the image information detecting circuit 124 generates the hold OFF signal to reset the data holding circuit 18d if the video zone stored in the image information memory circuit 123 is not present in the entire image of the subject. As in the second embodiment, there is no particular limitation upon the method used by the image information detecting circuit 124 to perform the comparison by which it is determined whether the video signal zone stored in the image information memory circuit 123 exists in the image of the present subject.

Second Modification of Second Embodiment

Figure 9:
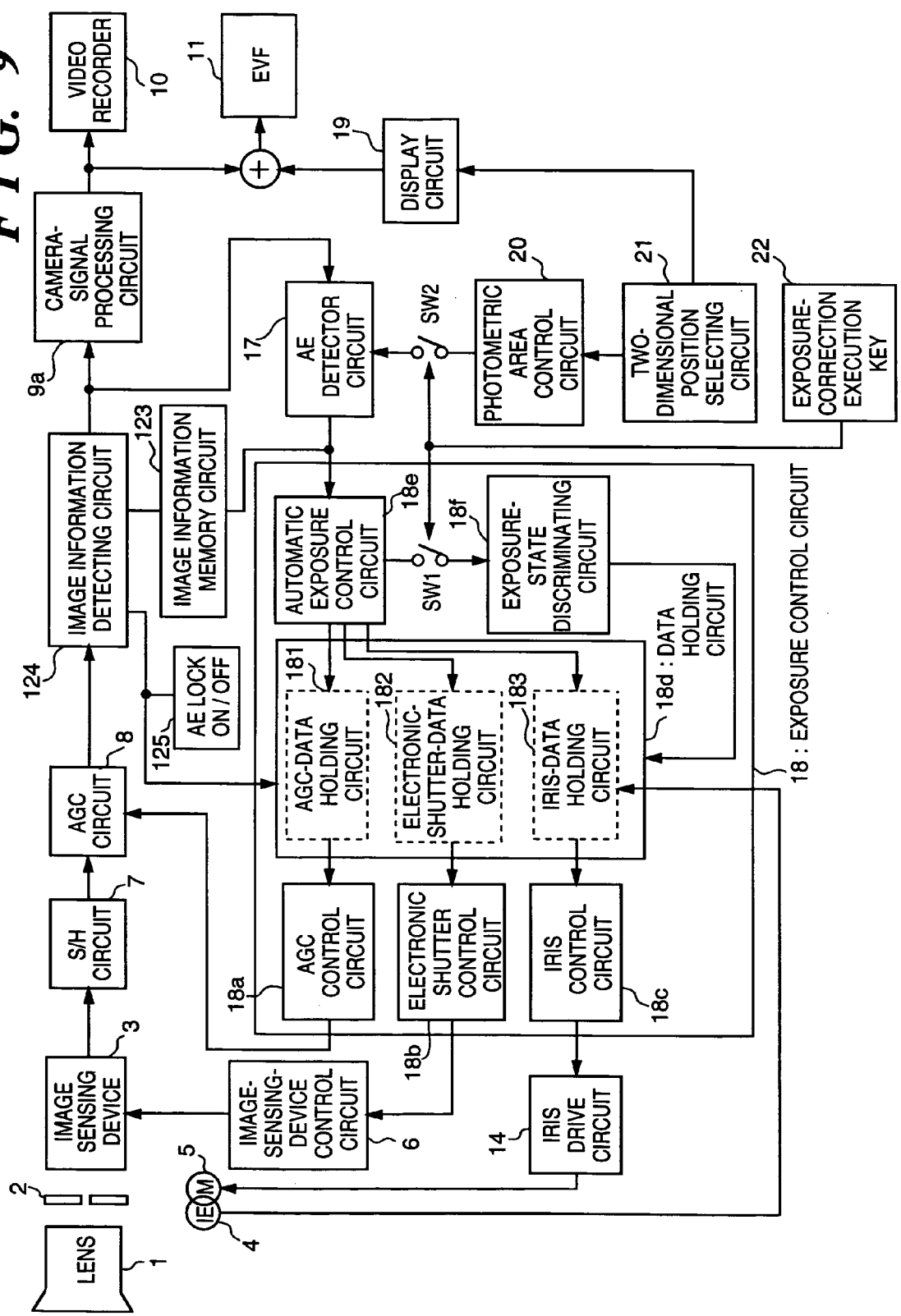
FIG. 9 is a block diagram illustrating the construction of an image sensing apparatus according to a second modification of the second embodiment of the present invention.

A second modification of the second embodiment will now be described. FIG. 9 is a block diagram illustrating the construction of an image sensing apparatus according to the second modification of the second embodiment. As shown in FIG. 9, the arrangement of FIG. 8 according to the second embodiment and modification thereof is additionally provided with an AE lock ON/OFF key 25 as selecting means for selecting whether the operation of the data holding circuit 18d is to be nullified or not. By using the lock ON/OFF key 25, the photographer is capable of selecting whether or not use is to be made of the function that automatically cancels the exposure holding state.

Third Embodiment

Figure 10:
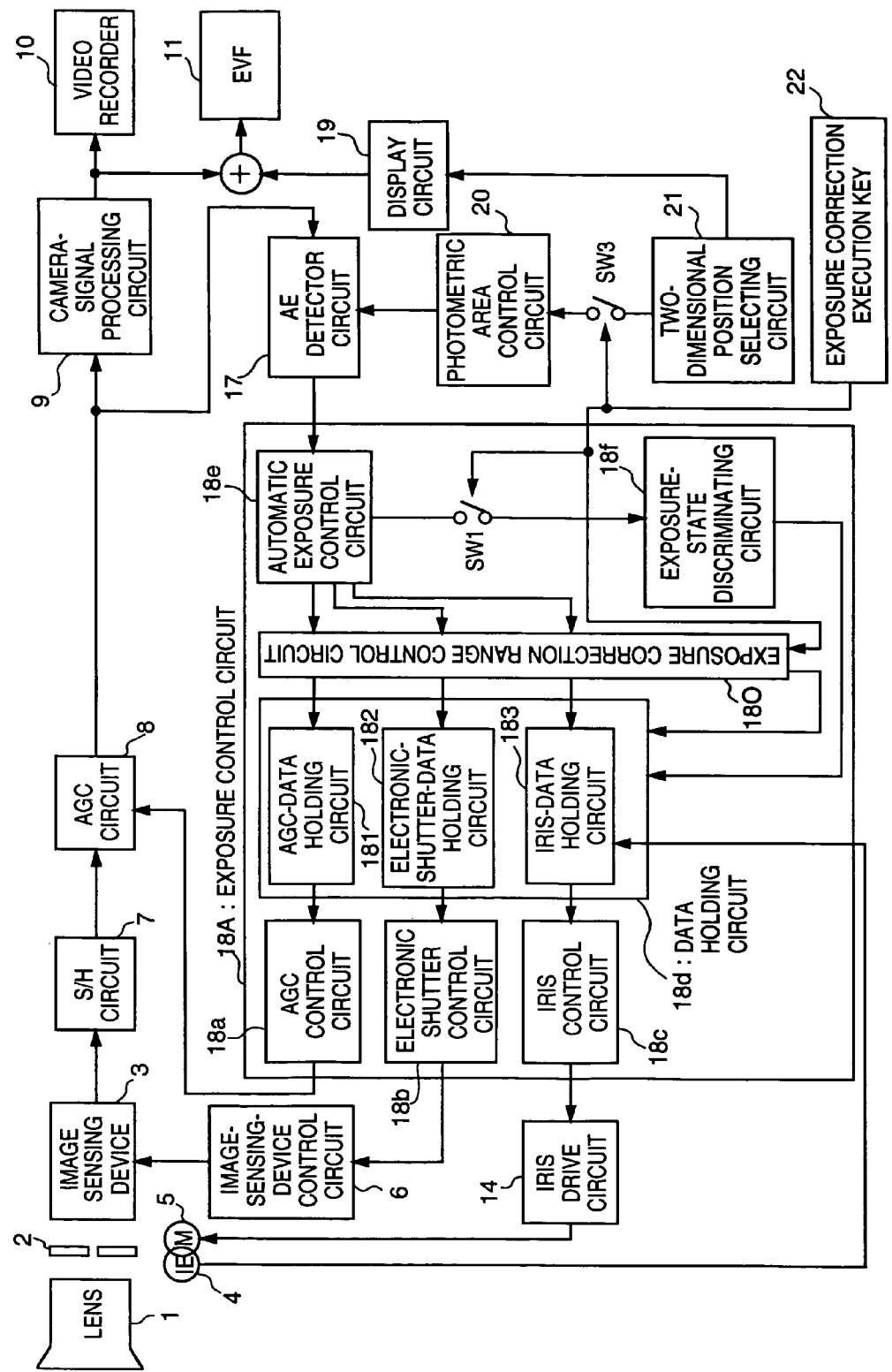
FIG. 10 is a block diagram illustrating the construction of an image sensing apparatus according to a second modification of the second embodiment of the present invention.

A third embodiment of the invention will now be described with reference to FIG. 10, which is a block diagram of an image sensing apparatus according to the present invention. Elements identified by reference characters the same as those shown in FIG. 13 of the first embodiment have similar functions and need not be described again in detail.

In this embodiment, an exposure control circuit 18A is further provided with an exposure correction range control circuit 18o. Operation at the time of automatic exposure control is performed in a manner similar to that of the first embodiment.

The details of manual exposure correction processing, which is a characterizing feature of the present invention, will be described.

In a case where optimum exposure cannot be achieved (e.g., the subject appears too dark because of backlighting or too bright because of excessive frontlighting) with automatic exposure control described above, the photographer corrects exposure manually. To accomplish this, the photographer uses the two-dimensional position selecting circuit 21 to set the position of the frame indicating the photometric area displayed on the screen of the EVF 11, as indicated at ② in FIG. 7, for example, thereby selecting the subject for which optimum exposure is desired. After the subject desired to be corrected for exposure has been selected by the two-dimensional position selecting circuit 21, the photographer presses the exposure-correction execution key 22 to enter the trigger signal when the exposure correction operation is desired to be started. When the trigger signal enters, the manual operation for correcting exposure begins.

The position information set by the two-dimensional position selecting circuit 21 enters the photometric area control circuit 20, which proceeds to control the photometric area for the purpose of detecting the state of exposure of the video zone corresponding to the position information. At this time the switch SW3 is turned on by the exposure-correction execution key 22, as a result of which the state of the video zone corresponding to the photometric area set by the photometric area control circuit 20 is detected by the AE detector circuit 17. The detection signal from the AE detector circuit 17 is outputted to the exposure control circuit 18A. In accordance with the detection signal from the AE detector circuit 17, the automatic exposure control circuit 18e selects exposure control parameters for the diaphragm mechanism 2, the electronic shutter which controls the charge storage time of the image sensing device 3 and the gain of the AGC circuit 8 and decides the amount of correction to be applied to each of these parameters. As a result, control is carried out so as to obtain stable, optimum exposure at all times.

Meanwhile, the trigger signal from the exposure-correction execution key 22 also turns on the switch SW1 of the exposure control circuit 18A so that the result of calculation from the automatic exposure control circuit 18e enters the exposure-state discriminating circuit 18f. Based upon the result of calculation from the automatic exposure control circuit 18e, the exposure-state discriminating circuit 18f determines, only when the switch SW1 is ON, whether a properly exposed state has been attained. If the exposure-state discriminating circuit 18f determines that the properly exposed state has been attained, the circuit 18f outputs a control signal which places the data holding circuit 18d in the hold ON state. When the switch SW1 is OFF, or if the result of the determination made by the exposure-state discriminating circuit 18f is that the state of exposure is not proper, the circuit 18f outputs a control signal which places the data holding circuit 18d in the hold OFF state.

In dependence upon the control signal from the exposure-state discriminating circuit 18f, the data holding circuit 18d outputs the iris control value, electronic shutter control value and AGC control value, as well as the correction values for these parameters, calculated by the automatic exposure control circuit 18e to the iris control circuit 18c when the hold OFF state is in effect. This makes it possible to perform a correction operation that follows up a change in the video signal attendant upon a change in the brightness of the subject detected by the AE detector circuit 17. In the hold ON state, the selection of the exposure control parameters, as well as the correction values of the parameters, which prevail at the instant the hold ON signal is outputted by the exposure-state discriminating circuit 18f, are stored in memory, and the stored values are outputted to the iris control circuit 18c, electronic shutter control circuit 18b and AGC control circuit 18a, whereby the set state of exposure is maintained irrespective of any change in the brightness of the subject.

Thus, when the trigger signal enters from the exposure-correction execution key 22, the correction operation is started so that the state of exposure of the video zone selected by the two-dimensional position selecting circuit 21 will be optimized. The correction operation continues until the exposure-state discriminating circuit 18f determines that the optimum state of exposure has been attained.

Figure 13:
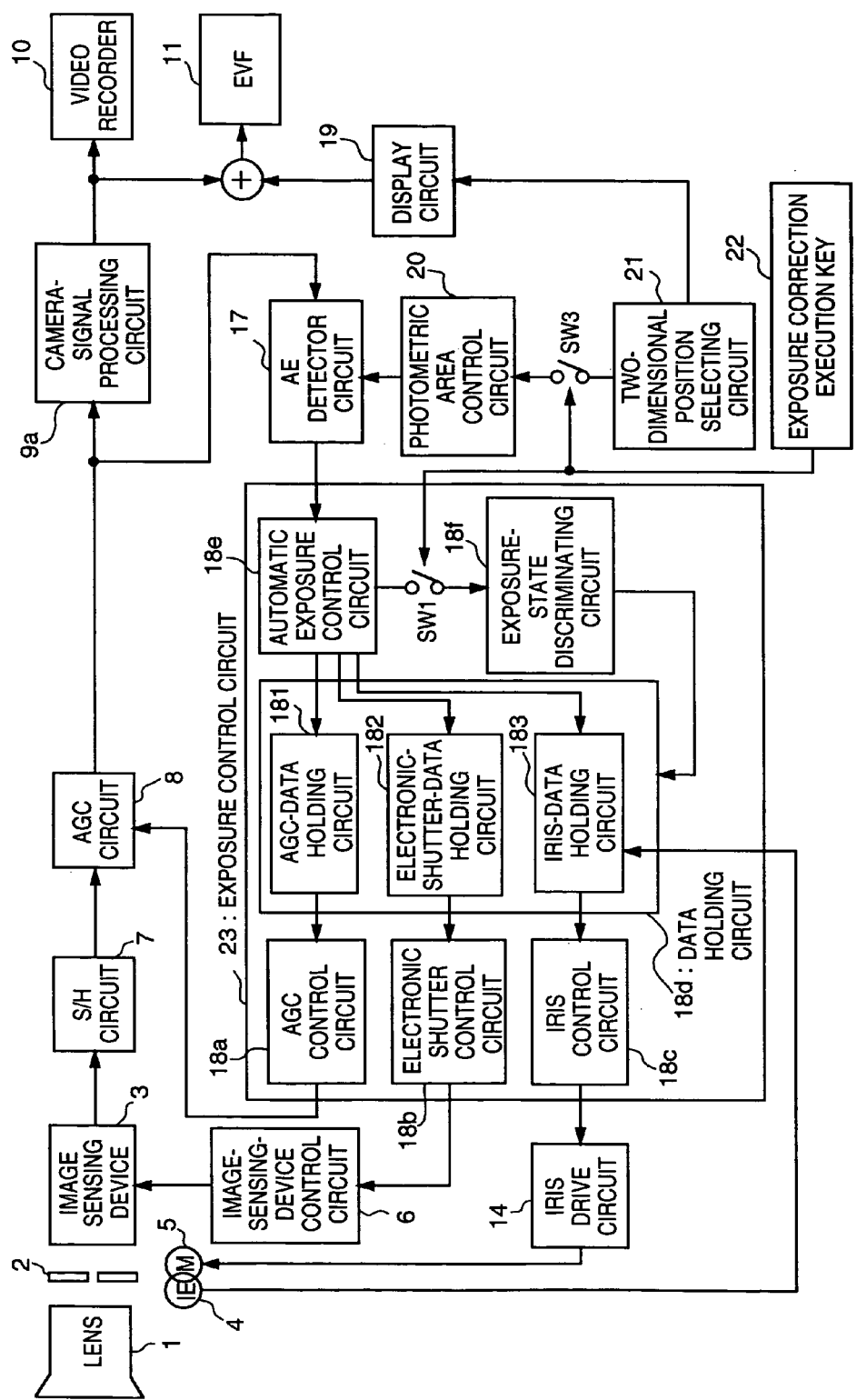
FIG. 13 is a block diagram illustrating the construction of the image sensing apparatus according to the first embodiment of the present invention.

The foregoing operation is similar to that of the first embodiment shown in FIG. 13. According to the present invention, the exposure correction range control circuit 18o is provided between the automatic exposure control circuit 18e and the data holding circuit 18d. As a result, the exposure correction range is limited. The exposure correction range control circuit 18o decides correction limiting values from a correction range set in advance. The range is centered on the selection of exposure control parameters such as the iris control value, electronic shutter control value and AGC control value, as well as the correction values of these parameters, obtained by the automatic exposure control circuit 18e at the moment the trigger signal enters from the exposure-correction execution key 22. For example, exposure control states may be represented by the typical states shown in FIG. 14.

Figure 14:
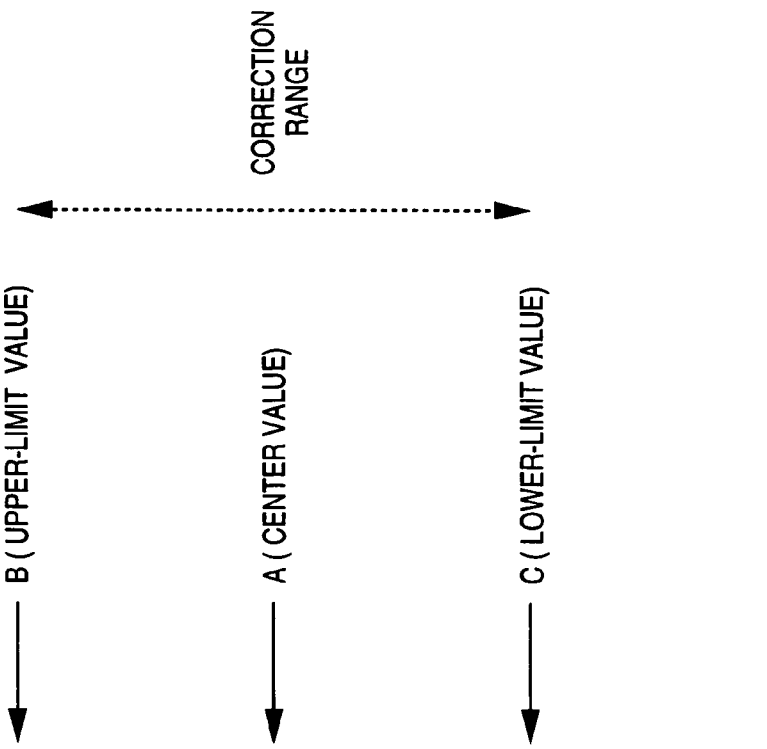
FIG. 14 is a diagram showing correction data in an exposure correction range control circuit according to the third embodiment of the present invention.

In this case, when the selection of the exposure control parameters such as the iris control value, electronic shutter control value and AGC control value, as well as the set values of these parameters, obtained by the automatic exposure control circuit 18e at the moment the trigger signal enters from the exposure-correction execution key 22 is the A state in FIG. 14, the correction limiting values are the B and C states if the correction range is made a region enlarged by five steps in each direction (i.e., ±5 steps). The correction in this case at execution of the manual exposure control operation takes place between B and C so that the optimum correction is performed B and C in dependence upon the signal from the AE detector circuit 17. By contrast, if the state of correction attains the correction limiting value decided by the exposure correction range control circuit 18o, the circuit 18o outputs the control signal which places the data holding circuit 18d in the hold ON state so that the state of exposure represented by this correction limiting value is held.

Accordingly, when the exposure-state discriminating circuit 18f determines that the optimum state of exposure has been attained, the exposure control circuit 18A terminates the correction operation and places the data holding circuit 18d in the hold ON state. However, even if it is determined that the optimum state of exposure has not been attained, the correction operation is terminated in a case where the state of correction has reached the correction limiting value set by the exposure correction range control circuit 18o. Thus, the exposure state based upon this correction limiting value is held. As a result, an over-correction which exceeds the correction range is eliminated. This makes it possible to obtain an exposure in which optimum balance between the exposure of the subject and the exposure of the subject periphery is maintained over the entire picture.

In a case where there is no input from the exposure-correction execution key 22 and automatic exposure control is not carried out, the exposure correction range control circuit 18o does not limit the correction range and operation is performed in a manner similar to that of the prior art.

First Modification of Third Embodiment

Figure 11:
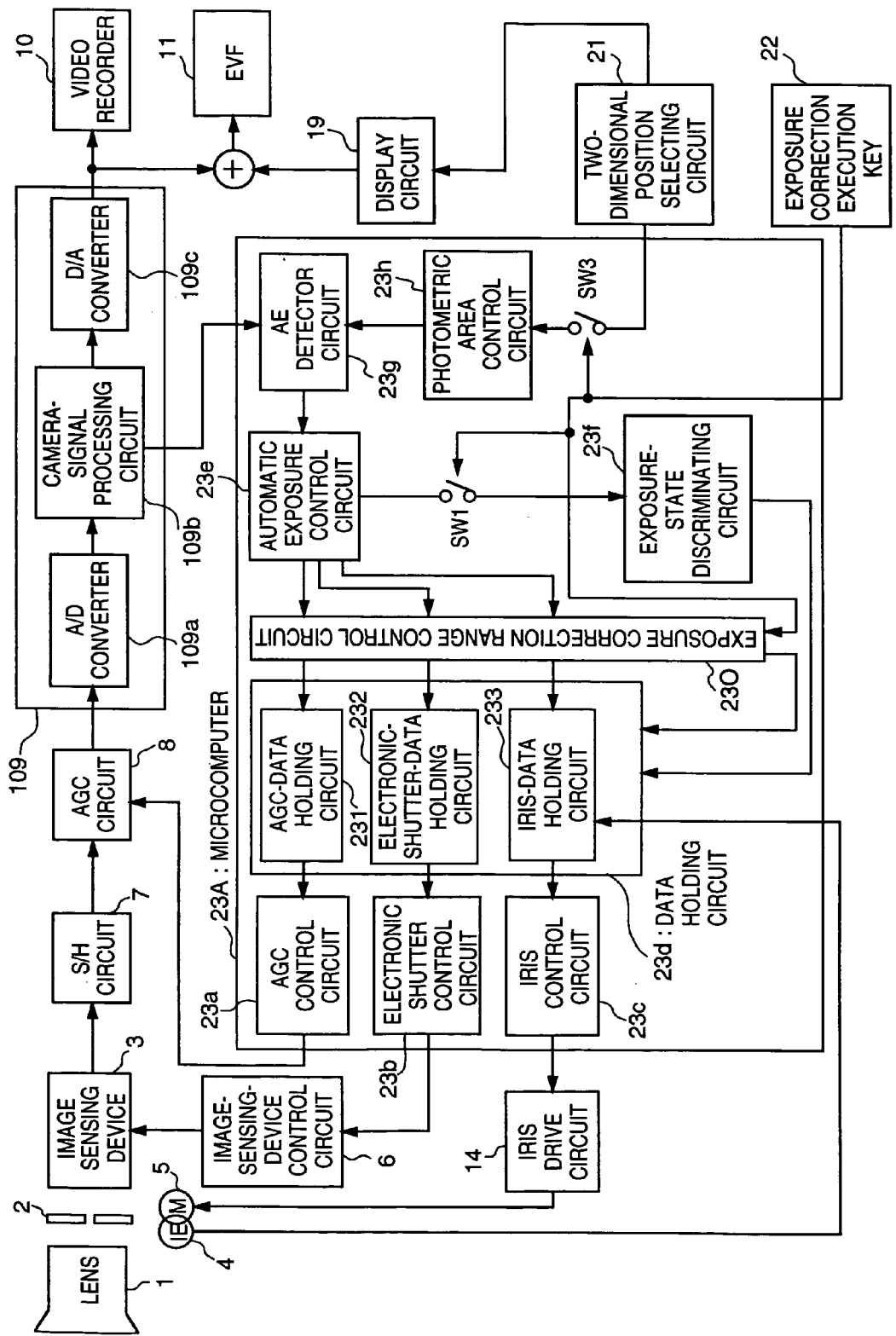
FIG. 11 is a block diagram illustrating the construction of an image sensing apparatus according to a first modification of a third embodiment of the present invention.

FIG. 11 is a block diagram illustrating the construction of an image sensing apparatus according to a first modification of the third embodiment.

In this modification, the camera-signal processing circuit 9 of the third embodiment (FIG. 10) is made a camera-signal processing circuit 109 that is capable of digital signal processing. Accordingly, the camera-signal processing circuit 109 comprises an A/D converter circuit 109a, a signal processing circuit 109b and a D/A converter circuit 109c. This makes it possible to realize the exposure control circuit by a microcomputer 23A which includes an AE detector circuit 23g, a photometric area control circuit 23h and a switch SW3. (It should be noted that the reference characters within the microcomputer 23A that are identical with those shown in FIG. 2 identify circuits have the same functions.) Accordingly, processing can be implemented in the form of digital signals through a simple arrangement. Other circuit functions and the exposure correction method are the same as those described in connection with the third embodiment and need not be described again.

Second Modification of Third Embodiment

Figure 12:
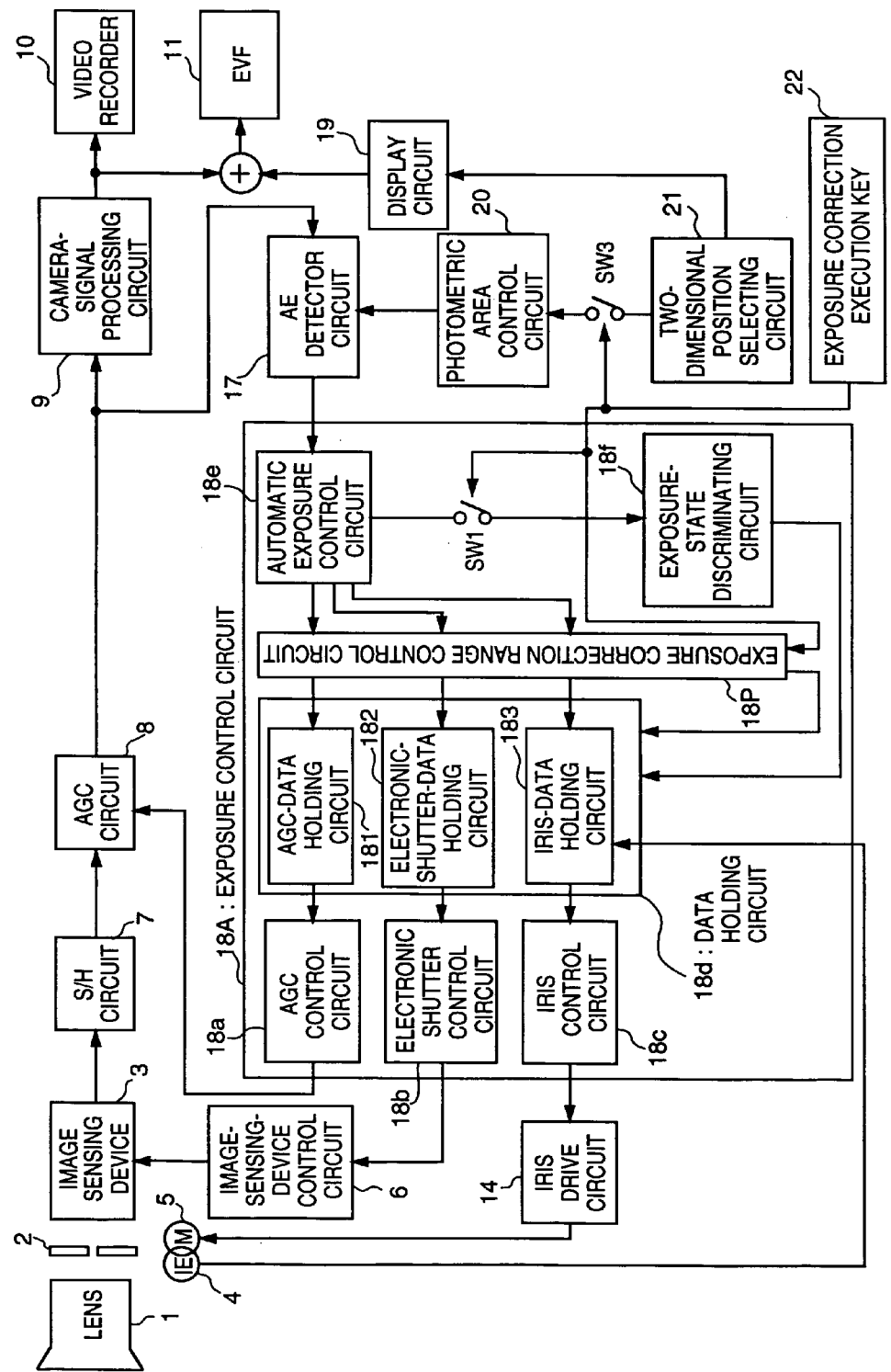
FIG. 12 is a block diagram illustrating the construction of an image sensing apparatus according to a second modification of the third embodiment of the present invention.

FIG. 12 is a block diagram illustrating the construction of an image sensing apparatus according to a third modification of the third embodiment.

This modification differs from the third embodiment (FIG. 10) in that an exposure control circuit 18p performs control in dependence upon the detection value from the AE detector circuit 17. Other elements are similar to those of the third embodiment and need not be described again.

The exposure control circuit 18o in the third embodiment described above decides correction limiting values from a correction range set in advance. The range is centered on the selection of exposure control parameters such as the iris control value, electronic shutter control value and AGC control value, as well as the correction values of these parameters, obtained by the automatic exposure control circuit 18e at the moment the trigger signal enters from the exposure-correction execution key 22. A case in which the correction range is made a region enlarged by five steps in each direction (i.e., ±5 steps) is taken as an one example.

Thus, according to the third embodiment, the range of correction is a fixed value set in advance. However, in a case where, as set forth in the description of the prior art, the screen is subdivided in the AE detector circuit 17, video is detected in each zone obtained by subdivision and the weighting of each items of detection data is changed to thereby perform finer exposure detection, the exposure control circuit 18p of this modification compares the state of exposure of the subject selected by the two-dimensional position selecting circuit 21 with the state of exposure of the periphery of the subject. Based upon information representing the difference in brightness obtained, the dynamic ranges of the image sensing device 3 and camera-signal processing circuit 9 are used effectively and a correction range is obtained in which the balance of the state of exposure of overall video is optimized.

Though the arrangement of the third embodiment has been cited as the basic arrangement, it goes without saying that it is also possible to apply the foregoing to each of the various above-described arrangements in the same manner.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus having an image sensor for sensing a subject image formed on an image sensing plane and outputting a video signal corresponding to the subject image, comprising:

a display unit adapted to display the subject image and a frame which surrounds a photometric zone superimposed on the subject image;

a zone changing unit used for changing position and size of the frame displayed on said display unit for designating a part of the subject image whose video signal is subjected to photometry;

an exposure detection unit adapted to detect an exposure condition corresponding to that of a video signal in the frame of the photometric zone changed by said zone changing unit;

an exposure control unit adapted to determine control parameters corresponding to the detected exposure condition and control exposure in accordance with the control parameters;

memory adapted to store the control parameters outputted by said exposure control unit when exposure control processing concerning the part of the subject image in the photometric zone by said exposure control unit is completed and an optimum exposure control state for the image in the frame of the photometric zone is obtained; and a control unit adapted to control said exposure control unit to maintain an exposure control state corresponding to the control parameters stored in said memory regardless of a change of a magnification of zooming means in the state that the control parameters corresponding to the optimum exposure control state is stored in said memory.

2. The apparatus according to claim 1, wherein if the control parameters are outside a prescribed range, said memory selects an upper-limit or a lower-limit of the prescribed range of control parameters as the control parameters.

3. The image sensing apparatus according to claim 1, further comprising a photometric zone detection unit adapted to determine whether the video signal captured by said image sensor contains said photometric zone upon elapse of a prescribed period of time, and outputting a signal for resetting control parameters in said memory if the captured video signal is not contained in said photometric zone.

4. The apparatus according to claim 1, further comprising a selecting unit adapted to allow a photographer to select whether maintenance of exposure by said memory is to be reset or not.

5. The image sensing apparatus according to claim 1, further comprising:

second memory adapted to store a video signal of said photometric zone; and a detector adapted to determine whether a zoomed video signal captured by said image sensor contains the video signal of said photometric zone stored in said second memory, and output a signal for resetting the control parameters in said memory if the captured video signal is not contained in said photometric zone.

6. The apparatus of claim 1, wherein operation of the exposure control unit is initiated in response to an exposure detection key.

7. An image sensing apparatus having a display unit for displaying a video signal sensed by an image sensor, comprising:

a superimposing unit adapted to superimposing a frame which shows a photometric zone on the subject image displayed on the display unit;

a pointing device used for changing position and size of the frame surrounding the photometric zone displayed on said display unit for designating a part of the subject image whose video signal is subjected to photometry;

an adjusting unit adapted to apply a prescribed adjustment to a video signal corresponding to the photometric zone changed by said pointing device;

memory used to store adjusting data outputted by said adjusting unit; and a control unit adapted to store the adjusting data in said memory when adjustment by said adjusting unit is completed and a prescribed state is obtained, and control said adjusting unit to maintain the prescribed state corresponding to the adjusting data stored in said memory regardless of a change of a magnification of zooming means.

8. The apparatus according to claim 7, wherein said pointing device is a line-of-sight detecting device for detecting position of a photographer's line of sight directed toward the screen.

9. The apparatus according to claim 7, wherein said pointing device is a mouse.

10. The apparatus according to claim 7, wherein said pointing device is a track ball.

11. The apparatus according to claim 7, wherein said adjusting unit adjusts exposure of the image sensing device by adjusting f-stop, a shutter and gain.

12. The apparatus according to claim 7, wherein when adjustment by said adjusting unit has attained a prescribed state, said control unit has attained a prescribed state, said control unit maintains the state of adjustment prevailing at this time.

13. The apparatus according to claim 7, further comprising selecting unit adapted to allow a photographer to select whether storage of the adjusting data by said control unit is performed or not.

14. The apparatus according to claim 7, wherein said screen is a monitor screen of an electronic viewfinder.

15. The apparatus of claim 7, wherein operation of the control unit is initiated in response to an exposure detection key.

* * * * *